United States Patent
Bergvall et al.

(10) Patent No.: US 6,532,850 B1
(45) Date of Patent: Mar. 18, 2003

(54) METHOD AND APPARATUS FOR DISSECTING LOGS

(75) Inventors: Jean Gunnar Bergvall, Altötting (DE); Nikolaus Gössl, Unterneukirchen (DE)

(73) Assignee: Esterer WD GmbH & Co., Rottenburg (DE)

( * ) Notice: Subject to any disclaimer, the term of this patent is extended or adjusted under 35 U.S.C. 154(b) by 0 days.

(21) Appl. No.: 09/328,941

(22) Filed: Jun. 9, 1999

(30) Foreign Application Priority Data

Jun. 10, 1998 (DE) .......................................... 198 25 938
Jun. 25, 1998 (DE) .......................................... 198 28 238

(51) Int. Cl.$^7$ .......................... B27B 13/00; B27B 29/00; B26D 5/00
(52) U.S. Cl. ..................... 83/44; 83/34; 83/35; 83/433; 83/475.2; 83/422; 83/707; 83/708; 83/808; 83/813; 83/578; 144/341; 144/369; 144/378
(58) Field of Search .............................. 83/34, 35, 39, 83/42, 43, 49, 703, 704, 707, 708, 409.1, 425.2, 433, 435.11, 437.11, 730, 788, 808, 813, 453, 578, 409, 418, 422; 144/340, 341, 367, 369, 376, 378

(56) References Cited

U.S. PATENT DOCUMENTS

| | | | | |
|---|---|---|---|---|
| 475,328 A | * | 5/1892 | Long ........................ 83/788 X |
| 524,135 A | * | 8/1894 | Edgar ....................... 83/707 X |
| 972,562 A | * | 10/1910 | Moore ...................... 83/406.1 |
| 2,201,413 A | * | 5/1940 | Turner ...................... 83/448 |
| 3,318,347 A | * | 5/1967 | Alich ....................... 83/808 X |
| 4,317,398 A | | 3/1982 | Jones et al. ................. 85/156 |
| 4,416,312 A | * | 11/1983 | Ostberg ..................... 144/39 |
| 4,485,861 A | * | 12/1984 | Nilsson et al. .............. 144/357 |
| 4,637,443 A | | 1/1987 | Jansson ..................... 144/39 |
| 4,697,487 A | * | 10/1987 | Cameron .................... 83/708 |
| 4,846,237 A | | 7/1989 | Wolf ........................ 144/377 |
| 4,879,659 A | | 11/1989 | Bowlin et al. .............. 364/468 |
| 5,088,363 A | * | 2/1992 | Jones et al. ................. 83/35 |

FOREIGN PATENT DOCUMENTS

| | | |
|---|---|---|
| DE | 7205947.7 | 2/1971 |
| DE | 35 32 642 A1 | 3/1986 |
| DE | 94 94 583.6 | 6/1994 |

\* cited by examiner

*Primary Examiner*—Boyer D. Ashley
(74) *Attorney, Agent, or Firm*—Weingarten, Schurgin, Gagnebin & Lebovici LLP

(57) ABSTRACT

A method and an apparatus for dissecting logs in a sawing installation are disclosed. The installation having a reciprocally moving longitudinal conveyor for moving the logs reciprocally through a double band saw assembly utilizing band saw blades having sawing teeth both on a forward longitudinal edge and a rearward longitudinal edge thereof. As a consequence, the log is sawn both during the forward stroke and during the backward stroke of the reciprocally moving conveyor. Between subsequent strokes the band saw blades are displaced radially with respect to the conveying direction such that during each stroke the log first comes into contact with an outward band saw blade and then with an inward band saw blade, both relative to the log axis.

6 Claims, 2 Drawing Sheets

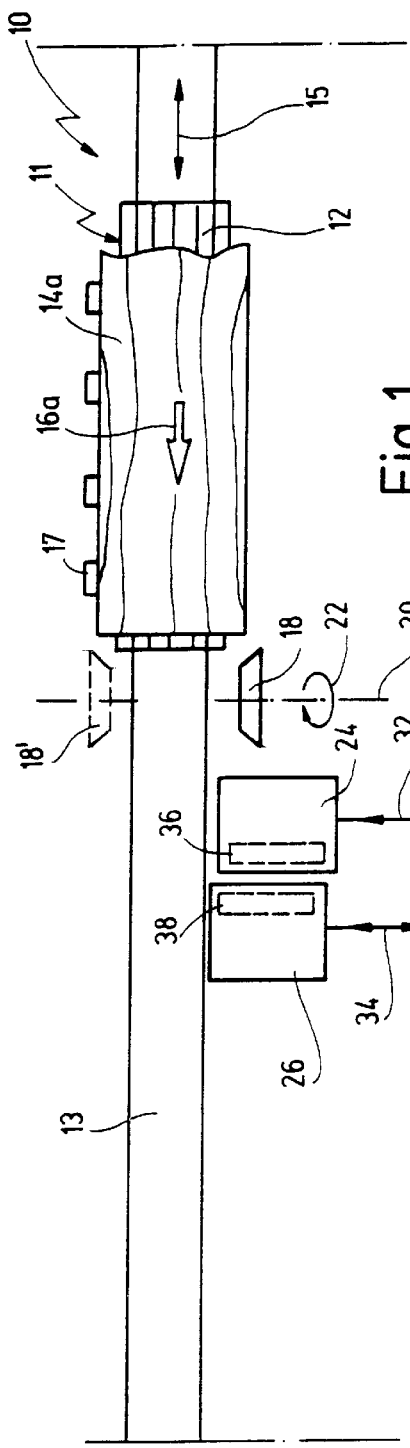
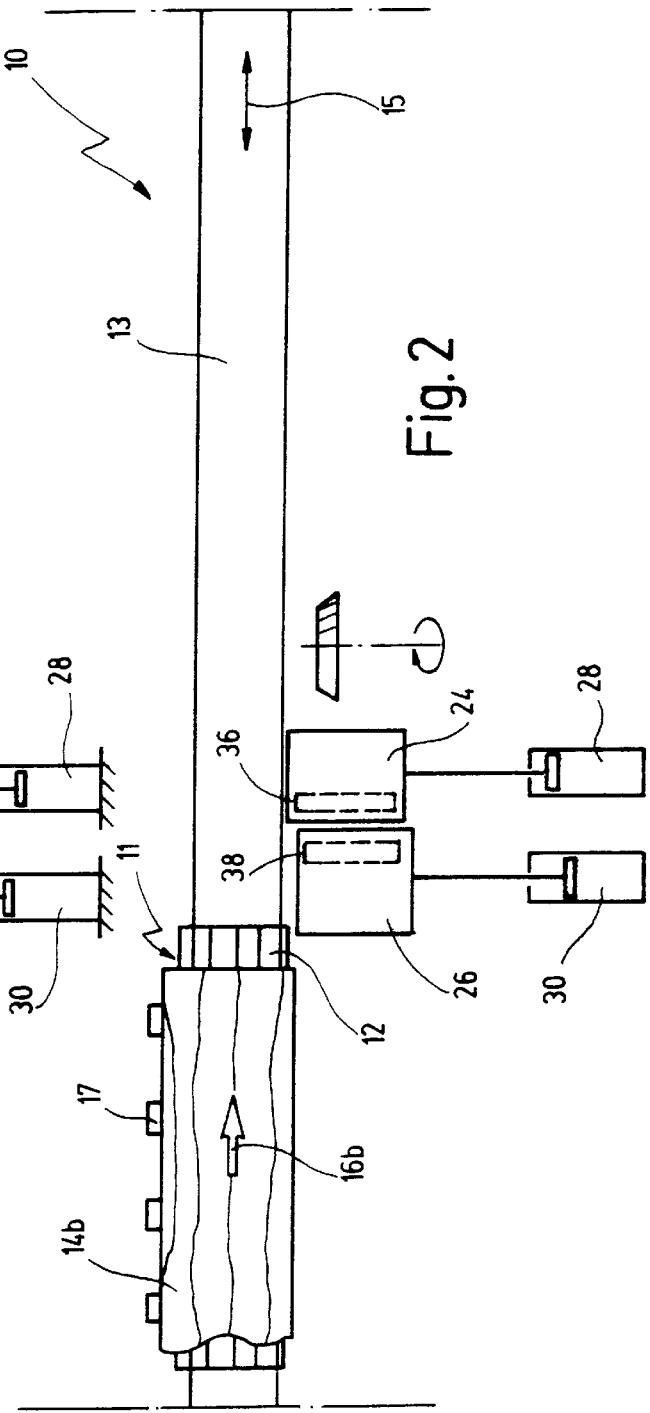

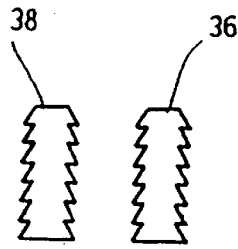 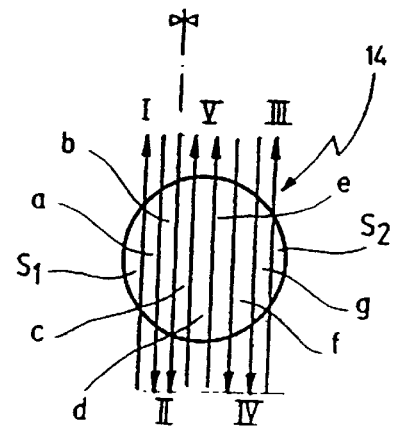
+ 73%
Fig. 3
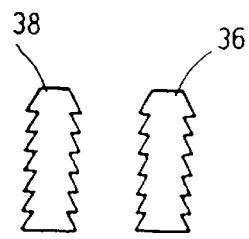 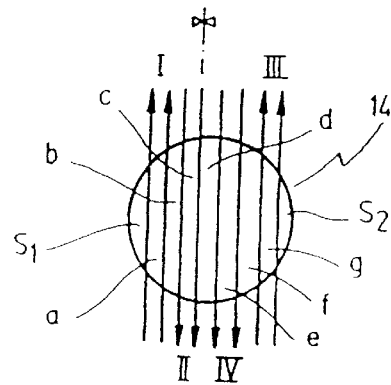
+ 110%
Fig. 4
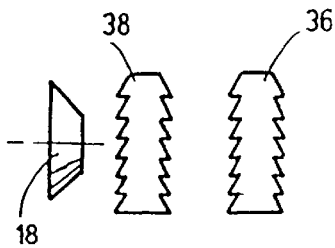 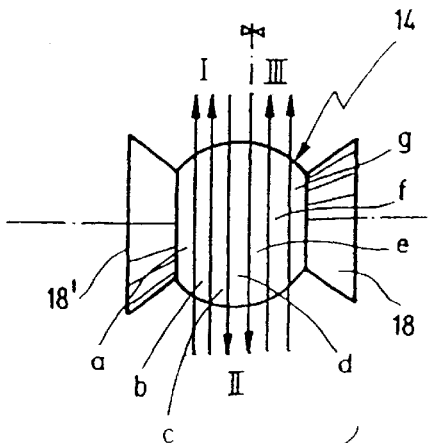
+ 129%
Fig. 5

METHOD AND APPARATUS FOR DISSECTING LOGS

FIELD OF THE INVENTION

The present invention relates to the field of dissecting logs in a sawing installation. More specifically, the invention is related to a method and an apparatus for dissecting logs in such installation where a longitudinal, reciprocating conveyor is used for moving the logs relative to a double band saw assembly.

Such sawing installations are used for entirely dissecting logs into boards and beams along a plurality of reciprocal conveyor movements.

BACKGROUND OF THE INVENTION

In the field of sawing installations various types of saws and sawing methods are used for converting a fresh log into a plurality of predetermined wood products, in particular boards and beams.

Besides reciprocating frame saws and circular blade saws one has also used various types of band saw assemblies for that purpose.

U.S. Pat. No. 3,318,347 discloses a method and an apparatus for multiple resawing utilizing a plurality of pairs of band saws being arranged on opposite sides of a longitudinal conveyor moving a log through the band saw assembly. By means of individual displacing units the various band saws may be positioned in a direction perpendicular to the conveyor direction. While doing so it is possible to entirely dissect the log in one pass only because the number of band saw blades used and their relative position to each other ensure that the log is dissected in so many wood products as desired. The thickness of the boards and beams so produced may be adjusted by displacing the band saw blades accordingly.

In this prior art installation the band saw blades are provided with sawing teeth only on one lateral edge thereof and the logs are fed through the band saw assembly in one direction only.

A similar band saw assembly is disclosed in German disclosure document 35 32 642 teaching, further, that the logs, prior to coming into engagement with the band saw blades, may be laterally flattened by means of appropriate chipping heads arranged upstream the band saw assembly.

German utility model 71 05 947, in contrast, teaches a recipro-cating conveyor band saw installation. In such an installation the log is affixed on a conveyor adapted to be reciprocally moved along a guide rail, thus moving the log through a band saw station and back again. The prior art band saw installation utilizes a band saw blade having also sawing teeth only on a lateral edge thereof. As a consequence, a wood product is sawn from the log only during a first conveyor stroke in a first direction whereas no such sawing action takes place when the conveyor is operated in a backward stroke taking the log back to its initial position. However, after each double stroke the band saw blade is forwarded by a predetermined amount in a direction perpendicular to the axis of conveyor displacement, the amount corresponding to the thickness of the next wood product to be sawn.

German utility model specification 94 04 583 discloses an endless band saw blade having teeth on both lateral edges thereof. However, only the teeth on one lateral edge are intended for sawing. The teeth on the opposite lateral edge are intended to remove dust or chips from the cutting area when, for example, a hand-held band saw is retracted after having made a cut into a piece of wood but not wholly through the wood. In such a case it may be that the saw blade is canted when being retracted because the sawn slit may be repleted with agglomerated saw dust or small chips. The rearward teeth on the band saw blade are, hence, only intended to remove such agglomerations of saw dust or chips but not for sawing.

One has, however, also used band saw blades having forward and rearward sawing teeth on opposite lateral edges in reciprocating band saw installations, as described before.

If a log shall be dissected by means of a band saw assembly having only one band saw blade, various configurations may be selected. The band saw blade may, for example, have teeth only on one lateral edge thereof. In that case, if the log shall be dissected into n boards, n+1 cuts are required. Further, the log after each pass has to be brought back into its starting position in front of the band saw assembly, either by means of a reciprocating conveyor or by means of another circulating device. From that initial position a second pass may be effected, sawing another board from the log.

As an alternative, one may, for example, provide chipping heads, as mentioned above, for flattening the log in an initial step on one side or on two opposite sides of the log. When doing so, one needs one cut or two cuts, resp. less for sawing n boards from a log. Therefore, if the log is initially flattened on both lateral sides, only n−1 cuts are required.

As already mentioned above, one has also used band saw blades having teeth on both lateral edges. In that case one must move the log on a reciprocating conveyor. The reciprocating longitudinal conveyor may be configured as a reciprocating saw carriage as is well known in the art and comprising a carriage that is reciprocally moved along a corresponding guide rail.

The log is held on the carriage by means of clamps engaging the log on an upper longitudinal side opposite the side where the band saw blades come into engagement. These clamps to a certain amount also allow alignment of the logs on the carriage. When doing so, the time needed for entirely dissecting a log may be drastically reduced because the log may be sawn both during the forward stroke and during the backward stroke of the reciprocating conveyor, however, the number of cuts required remains the same even when in the above-mentioned alternate configuration a pair of clipping heads is used for laterally flattening the log prior to the first saw cut.

It is, further, well known in the saw mill technology to use so-called tandem-assemblies utilizing two band saw blades being distant from each other in a direction perpendicular to the conveyor axis. They are normally offset with respect to each other by the thickness of the board to be sawn. The two band saw blades are usually arranged in a staggered configuration, i.e. are also offset along the conveyor direction. If the log is fed through the tandem assembly, the outwardly lying band saw blade comes into engagement with the log first and the other band saw blade being at a somewhat more innerward position comes into engagement next.

For that reason it is hardly possible to use such tandem assemblies with double-teethed band saw blades. For, during the back stroke of the conveyor the log would first come into engagement with the inner band saw blade and then with the outer band saw blade which is highly disadvantageous for technological reasons.

It is, therefore, an object underlying the invention to improve a method and an apparatus of the above-mentioned kind such that the above-described disadvantages are obviated. In particular, the performance and throughput of conventional sawing installations shall be drastically improved.

SUMMARY OF THE INVENTION

These and other objects are solved by the inventive method and apparatus of the present application.

For that purpose, the invention proposes a method for dissecting logs in a sawing installation having:

- a longitudinal conveyor adapted to be reciprocally moved along a first axis;
- a first band saw blade extending along a second axis essentially perpendicular to the first axis, the first band saw blade having forward sawing teeth and rearward sawing teeth on a forward longitudinal edge and a rearward longitudinal edge, resp. thereof;
- means for displacing the first band saw blade along a third axis essentially perpendicular to the first and the second axes;
- a second band saw blade extending along a fourth axis essentially parallel to the second axis, the second band saw blade having forward sawing teeth and rearward sawing teeth on a forward longitudinal edge and a rearward longitudinal edge, resp. thereof;
- means for displacing the second band saw blade along a fifth axis being essentially parallel to the third axis;

the method comprising the steps of:
- a) placing a log on the conveyor;
- b) affixing the log to the conveyor;
- c) positioning the first band saw blade along the third axis to a first predetermined position on the third axis;
- d) positioning the second band saw blade along the fifth axis to a first predetermined position on the fifth axis;
- e) moving the conveyor along the first axis in a first direction, the first positions on the third and the fifth axis, resp. being selected such that the first and the second band saw blades effect two parallel cuts through the log by means of the forward sawing teeth;
- f) positioning the first band saw blade along the third axis to a second predetermined position on the third axis;
- g) positioning the second band saw blade along the fifth axis to a second predetermined position on the fifth axis; and
- h) moving the conveyor along the first axis in a second direction opposite the first direction, the second positions on the third and the fifth axis, resp. being selected such that the first and the second band saw blades effect two further parallel cuts through the log by means of the rearward sawing teeth.

For the same purpose, the invention, further, suggests an apparatus for dissecting logs in a sawing installation having:

- a longitudinal conveyor adapted to be reciprocally moved along a first axis, the conveyor comprising log receiving means and log clamping means;
- a first band saw blade extending along a second axis essentially perpendicular to the first axis, the first band saw blade having forward sawing teeth and rearward sawing teeth on a forward longitudinal edge and a rearward longitudinal edge, resp. thereof;
- first means for displacing the first band saw blade along a third axis essentially perpendicular to the first and the second axes;
- a second band saw blade extending along a fourth axis essentially parallel to the second axis, the second band saw blade having forward sawing teeth and rearward sawing teeth on a forward longitudinal edge and a rearward longitudinal edge, resp. thereof; and
- second means for displacing the second band saw blade along a fifth axis being essentially parallel to the third axis.

The object underlying the invention is thus entirely solved.

According to the invention, the radial positions of the band saw blades relative to the conveyor axis are interchanged during each change of direction of the conveyor. When doing so, a band saw blade having had an outer position during the last conveyor stroke will now assume the inner position and vice versa. As a consequence, during each stroke of the conveyor the outer band saw blade may first come into engagement with the log, as is intended for technological reasons.

The band saw assemblies may be provided with a variety of displacement units. For example, one may provide two entirely independent band saw assemblies having two likewise independent displacement units controlled by an appropriate circuitry in a push-pull operation. As an alternative, one may also use integral systems having a common drive motor for both band saw blades and a common displacement unit comprising an appropriate alternating transmission generating the required alternate displacement of the band saw blades.

In a preferred embodiment of the invention one may, as known per se, chip or flatten the logs at least on one lateral side thereof prior to making the first cuts. For that purpose one may use one or two opposite chipping heads as also well known in the art.

For dissecting logs into boards or beams one may use various cutting sequences. Within these cutting sequences it may be advantageous to rotate the logs by 180° about the log longitudinal axis during a change of conveyor direction. When doing so, it is much simpler to let the band saw assembly engage the logs because the band saw assembly is normally located on one lateral side of the longitudinal conveyor.

It goes, further, without saying that within the scope of the present invention more than two band saw blades with appropriate change in position may be used. One may also use radial offsets between band saw blades corresponding to integer multiples of board thicknesses when displacing the band saw blades in a radial direction. Further, one may also displace the band saw blades by arbitrary amounts, for example when wood products of different thicknesses shall be produced, for example boards and beams.

Further advantages will become apparent from the subsequent description and the enclosed drawing.

It goes without saying that the features mentioned before and those that will be explained hereafter may not only be used in the particularly given combination but also in other combinations or alone without leaving the scope of the present invention.

BRIEF DESCRIPTION OF THE DRAWINGS

Various embodiments of the invention are shown in the drawing and will be explained in more detail within the subsequent description.

FIG. 1 shows a highly schematic top plan view of an embodiment of a sawing installation according to the invention in a first operational position;

FIG. 2 shows the saw mill installation of FIG. 1, however, in a second operational position; and FIGS. 3 through 5 show three schematic depictions for explaining a sequence of saw cuts according to three different embodiments of the invention.

DETAILED DESCRIPTION OF THE PREFERRED EMBODIMENT

In FIG. 1 reference numeral 10 as a whole indicates a sawing installation, being only a small portion of a big industrial saw mill. Sawing installation 10 is used for dissecting logs into wood products like boards or beams by means of band saws.

Within sawing installation 10 a longitudinal conveyor, generally indicated at 11, preferably comprises a log band sawing carriage 12 which may be moved along a guide rail 13 in opposite directions, as indicated by a double arrow 15. FIG. 1 shows a log 14a on top of carriage 12. In FIG. 1 log 14a is moved in a forward stroke to the left hand side direction, as indicated by an arrow 16a. Log 14a is held on top of carriage 12 by means of clamps 17 engaging log 14a on a longitudinal side thereof.

In the position shown in FIG. 1, log 14a, as seen in the direction of movement, is just right in front of a chipping head 18 being provided alone or as a pair 18, 18' of such chipping heads on one or both lateral sides of longitudinal conveyor 11. Chipping head 18 may be rotated about an axis 20 extending perpendicular to the conveyor direction, as indicated by an arrow 22. Chipping head 18 is used for initially chipping away the barks of log 14a. After the first stroke being completed, chipping head 18 is no more operative.

After having passed chipping head 18, log 14a comes into the operating area of two band saw assemblies 24, 26 being arranged one after the other in the direction of transportation of log 14a. Band saw assemblies 24, 26 are located on the side of carriage 12 opposite clamps 17.

Band saw assemblies 24, 26 are configured to be displaced in a direction perpendicular to the conveyor direction of conveyor 11 between strokes thereof. Two stationary displacement units 28, 30, for example fluid-operated piston-and-cylinder units, are provided for displacing band saw assemblies 24, 26 along the afore-mentioned direction of displacement, as shown with double arrows 32 and 34.

In the operational position shown in FIG. 1, first band saw assembly 24 is somewhat more offset from carriage 12 and log 14a as compared with second band saw assembly 26. The difference in offset between band saw assemblies 24 and 26 relative to conveyor 11 in that case exactly corresponds to the thickness of a board to be sawn, as will be explained in more detail below.

Band saw assemblies 24 and 26 are both provided with a peripheral band saw blade 36 and 38, resp. As band saw blades 36 and 38 are likewise positioned on band saw assemblies 24 and 26, first band saw blade 36 is at a greater distance from carriage 12 as compared with second band saw blade 38 in the operational position shown in FIG. 1.

If log 14a after having passed chipping head 18 comes into the area of band saw assemblies 24 and 26, first band saw blade 36 will, hence, apply a more outward cut to log 14a whereas thereafter second saw blade 38 will apply a somewhat more inward sawing cut.

As soon as log 14a has entirely passed band saw assemblies 24, 26, the installation is switched into the second operational position of FIG. 2 where the conveying direction of conveyor 11 is inverted into a backward stroke, now being from left to right in FIG. 2. In FIG. 2 this is indicated by an arrow 16b in log 14b.

Simultaneously with the inversion of the conveying direction, displacement units 28 and 30 are actuated such that second band saw assembly 26 now has a greater distance from carriage 12 whereas first band saw assembly is now closer to carriage 12. The distance between band saw blades 36 and 38, however, now again corresponds to the thickness of a board to be sawn next. Band saw blades 36 and 38 for that purpose are provided with sawing teeth on opposite lateral edges thereof, as one may see in more detail in FIGS. 3–5. As a consequence, band saw blades 36 and 38 in FIG. 1 may either saw from right to left or from left to right.

Additionally, either log 14b was displaced in a direction perpendicular to the conveying direction of conveyor 11 or band saw assemblies 24, 26 have been displaced accordingly relative to carriage 12. While doing so, it is ensured that band saw blades 36, 36 now apply two more sawing cuts on two more radial positions of log 14b as will be explained in more detail below in connection with FIGS. 3–5.

The reciprocal movements, according to which after the log 14 having passed band saw assemblies 24 and 26 both the conveying direction of conveyor 11 is inverted as the radial position of band saw assemblies 24 and 26 and/or of log 14 is readjusted, may now be repeated cyclically several times as will also be discussed in more detail together with FIGS. 3–5, until log 14 at the end is entirely dissected into the desired number and kinds of boards or beams.

FIGS. 3–5 show three distinct inventive methods for dissecting logs 14. On the left hand side of FIGS. 3–5, the double-teethed band saw blades 36 and 38 are shown, wherein in the embodiments of FIGS. 3 and 4 only these band saw blades 36 and 38 are used whereas in the case of FIG. 5 a chipping head 18 or a pair of chipping heads 18, 18' on one or both sides, resp., of conveyor 11 are used.

In the right hand portion of FIGS. 3–5, a radial cross section through log 14 is shown. In the depicted embodiment seven boards a, b, c, d, e, f, g shall be produced. Barks $S_1$ and $S_2$ on lateral sides shall concurrently be removed. Roman figures I, II, III, IV, V indicate the various sawing operations, i.e. the passes of log 14 through band saw assemblies 24 and 26.

In the embodiment of FIG. 3, bark $S_1$ is removed in a first pass I by means of second band saw blade 38, whereas first band saw blade 36 passes outside bark $S_1$ without being in engagement. In a second pass II, the first two boards a and b are sawn away. The log is now rotated on carriage 12, i.e. by 180° about its longitudinal axis, as shown with a dash-dot line in FIG. 3. As a consequence, in a third pass III only the opposite bark $S_2$ is removed by means of first band saw blade 36, whereas second band saw blade 38 passes at the outside of bark $S_2$ without being in engagement. This is because third pass III takes place exactly according to the illustration in FIG. 1.

In a fourth pass IV, boards f and g are sawn away whereas in a fifth pass V boards c, d and e are finally produced.

In this embodiment of the invention with five passes, an increase in productivity by 73% is achieved as compared with a configuration utilizing only one band saw blade having teeth only on one lateral edge thereof.

According to a first modification of this method, as shown in FIG. 4, first pass I is already utilized for removing both bark $S_1$ as well as a first board a. During the backward stroke, boards b and c are sawn away in a second pass II. The log is then again rotated on carriage 12 so that in a third pass III both bark $S_2$ as well as board g may be sawn away. Boards d, e and f follow in a fourth pass IV.

This embodiment of the invention with four passes, therefore, yields an increase of productivity by 110% as compared with the prior art mentioned before.

In still another embodiment of the invention shown in FIG. 5, chipping heads 18 and 18' are additionally used. In that case three passes I, II and III (involving a rotation of log 14 after pass II) are sufficient to saw away all seven boards a through g with barks $S_1$ and $S_2$ having been chipped away prior to the first pass through band saw assemblies 24 and 26.

In that case with three passes only, the increase of productivity is about 129%.

What is claimed is:

1. A method for dissecting logs in a sawing installation having:

a log carriage adapted to be reciprocally moved along a first axis;

a first band saw blade extending along a second axis essentially perpendicular to said first axis, said first band saw blade having forward sawing teeth and rearward sawing teeth on a forward longitudinal edge and a rearward longitudinal edge thereof, respectively;

means for displacing said first band saw blade along a third axis essentially perpendicular to said first and said second axes;

a second band saw blade extending along a fourth axis essentially parallel to said second axis, said second band saw blade having forward sawing teeth and rearward sawing teeth on a forward longitudinal edge and a rearward longitudinal edge thereof, respectively;

means for displacing said second band saw blade along a fifth axis being essentially parallel to said third axis;

the method comprising the steps of:

a) placing a log on said carriage;

b) affixing said log to said carriage;

c) positioning said first band saw blade along said third axis to a first predetermined position on said third axis;

d) positioning said second band saw blade along said fifth axis to a first predetermined position on said fifth axis;

e) moving said carriage along said first axis in a first direction, said first predetermined position on said third axis and said first predetermined position on said fifth axis being selected such that said first and said second band saw blades effect two parallel cuts through said log by means of said forward sawing teeth;

f) positioning said first band saw blade along said third axis to a second predetermined position on said third axis;

g) positioning said second band saw blade along said fifth axis to a second predetermined position on said fifth axis; and h) moving said carriage along said first axis in a second direction opposite said first direction, said second predetermined position on said third axis and said second predetermined position on said fifth axis being selected such that said first and said second band saw blades effect two further parallel cuts through said log by means of said rearward sawing teeth, wherein said first and said second band saw blades, when being displaced from said first predetermined positions on said third and fifth axes, respectively, to said second predetermined positions on said third and fifth axes, respectively, are displaced reciprocally, and wherein said first and said second predetermined positions on said third and fifth axes, respectively, are selected such that said log, during said carriage moving steps (e end h) and relative to a log center axis, first comes into engagement with one of the first or second band saw blades having a more outside position and subsequently cames into engagement with the other of said first or second band saw blades having a more inside position said outside and inside positions of said band saw blades depending upon the direction of said carriage.

2. The method of claim 1, wherein during step e) said log is laterally flattened prior to coming into engagement with said first saw blade and said second saw blade.

3. The method of claim 1, wherein said first predetermined positions on said third and fifth axes, respectively, are axially offset relative to each other by a predetermined spacing corresponding to a thickness of a board to be sawed.

4. The method of claim 1, wherein said second predetermined positions on said third and fifth axes, respectively, are axially offset relative to each other by a predetermined spacing corresponding to a thickness of a board to be sawed.

5. The method of claim 1, wherein between steps e) and h) said log is, rotated about a longitudinal axis thereof.

6. The method of claim 5, wherein said log is rotated by 180 degrees.

* * * * *